Dec. 27, 1955 H. WIRTH 2,728,701
FRICTION ELEMENT AND METHOD OF MAKING SAME
Filed Aug. 28, 1951 2 Sheets-Sheet 1
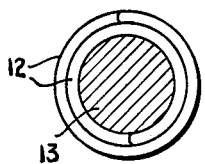
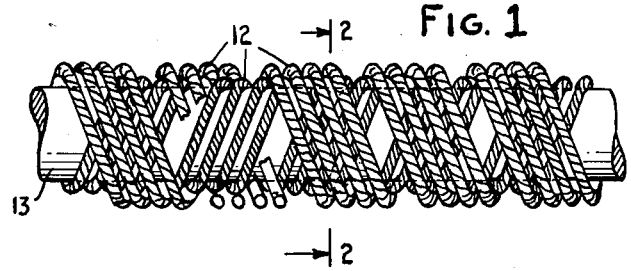
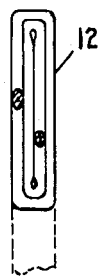
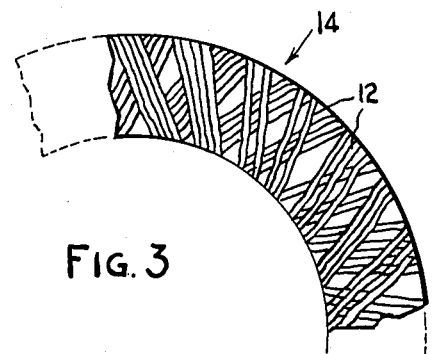
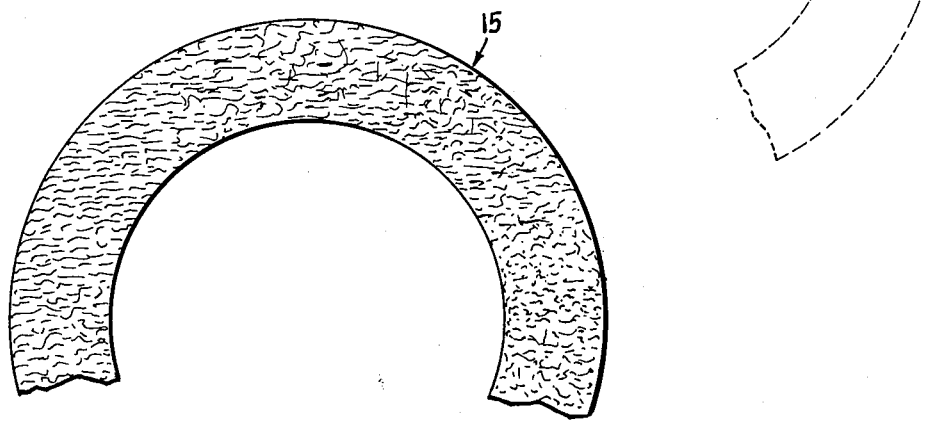
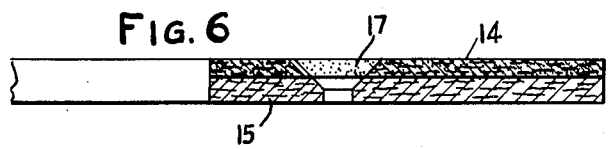
INVENTOR.
HANS WIRTH
BY
*I. Jordan Kunik*
ATTORNEY Dec. 27, 1955  H. WIRTH  2,728,701
FRICTION ELEMENT AND METHOD OF MAKING SAME
Filed Aug. 28, 1951  2 Sheets-Sheet 2
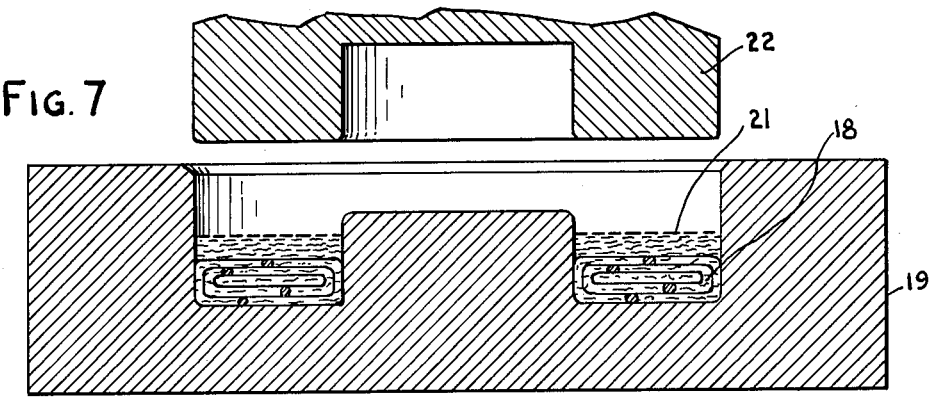
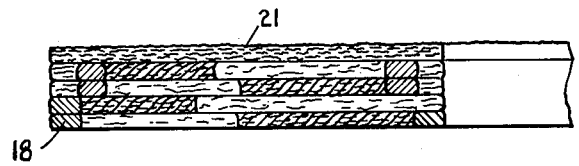
INVENTOR.
HANS WIRTH
BY
ATTORNEY United States Patent Office 2,728,701
Patented Dec. 27, 1955

2,728,701

FRICTION ELEMENT AND METHOD OF MAKING SAME

Hans Wirth, Middletown, Conn., assignor, by mesne assignments, to Thermoid Company, Hamilton Township, N. J., a corporation of Delaware Application August 28, 1951, Serial No. 244,043

14 Claims. (Cl. 154—81)

This invention relates to friction elements such as clutch facings and brake linings and to improved methods of making such elements.

This invention is particularly concerned with a method of making laminated friction elements wherein a high grade facing is bonded to a less costly backing in such a manner as to produce a superior product.

Although laminated types of friction elements have heretofore been known, I utilize a novel combination of components which when bonded to each other produce hitherto unrealized advantages such as higher strength, longer life and economies in cost.

It is therefore an object of the invention to provide a friction element having improved friction characteristics.

Another object of the invention is to provide laminated friction elements having a high grade friction facing and a backing element of less expensive material integrally bonded thereto.

A further object of the invention is to provide improved methods of making laminated friction elements.

With these and other objects in view the invention embodies a friction element having a high grade friction facing laminated to a less expensive backing material and improved methods of forming and bonding these component parts which will be described in connection with the accompanying drawings, in which:

Figure 1 is a fragmentary elevation of a mandrel upon which strands of friction material, partly broken away, are helically wound;

Figure 2 is a schematic cross section view of the windings taken on line 2—2 of Fig. 1, with the mandrel omitted;

Figure 3 is a fragmentary schematic elevation of the friction facing made of the helical windings curved into the form of a clutch facing and pressed flat;

Figure 4 is an enlarged schematic cross section view of the windings shown in Figure 3;

Figure 5 is a fragmentary schematic elevation of a piece of backing material to which the friction facing shown in Figure 4 is to be bonded;

Figure 6 is a greatly enlarged cross section of the laminated friction element embodying the principles of the present invention;

Figure 7 is a cross section view of a portion of a die in which another form of laminated friction element is made; and Figure 8 is a greatly enlarged cross section view of the friction element made in accordance with the method shown in Figure 7.

It will be noted that all the figures of the drawings must of necessity be more or less schematic since the nature of the materials used are not as easily amenable to line drawings as they would be to representations in halftones or the like. Nevertheless, the exact nature of the inventive features herein will be clearly understood from the following description taken in connection with these drawings.

The present invention utilizes as the friction portion of the laminated facing a structure of strands of asbestos fabric wound into helical coils, pressed flat and cured into a friction element as described in my Patent No. 2,587,945, issued March 4, 1952, and my copending United States patent application Serial No. 241,599, filed August 13, 1951, now Patent No. 2,676,761.

That type of friction element when made entirely of such a structure is quite expensive, particularly in view of the fact that when the friction element has been worn down in use to the level of the bolt heads securing the friction elements to the clutch head or brake shoe, the remainder of the facing has to be discarded.

I now form a friction element wherein the friction facing portion is composed of the superior wound strand formation while the backing of the element is formed of a compacted fibrous asbestos mixture which is considerably cheaper in cost but which has sufficient strength to carry the strand facing thereon. In this manner a lesser amount of expensive stranded material is used while the less expensive backing material only need be discarded when the facing portion has been worn down.

The strands utilized in forming the helical coils may consist of several strands of fiber material twisted around a wire core. The fiber material may consist of about 85% asbestos fiber together with 15% cotton fiber. These proportions may vary or other types of fibers may be used. These strands may consist also of asbestos yarn, asbestos covered wire or other strand-like material suitable for the construction of friction facings for clutch facings and brake linings as are well known in the art.

Prior to winding, the strands are treated with a preparation that serves both as a filler and thermosetting binder for said strands. The filler or binder composition may include such materials as oil (linseed, tung, oiticica, soybean), formaldehyde resin, phenol formaldehyde resin, cresylic acid, carbon black, powdered brass, powdered aluminum, alcohol, toluol, naphtha, rubber (natural or synthetic, in solution or as latex), sulphur, accelerators, antioxidants.

The various proportions of these materials, some of which may be omitted, are determined by the type of friction facing desired and these compositions may be determined empirically as is well known in the art.

After being thoroughly impregnated with the binder and filler material, the strands are dried with the application of heat or a blast of air or both in order to drive off the various solvents that are used in the impregnated compositions.

As shown in Figures 1 and 2, the impregnated strands 12 are now helically wound in criss-cross layers on mandrel 13. The windings are then removed from the mandrel, the ends of the longitudinal coil are brought together to form a circular element, after which the windings are pressed flat in the form of a biscuit or disk, generally designated 14, as shown in fragmentary form in Fig. 3. An enlarged schematic cross section of the disk is shown in Fig. 4.

It will be noted that strands 12 extend more or less radially on facing 14 between the internal and external diameters thereof, and are arranged at angles from the longitudinal dimension of the curved disk. If the longitudinal helical coil is pressed flat in a straight strip for making brake linings, the strands would be arrayed at angles to the longitudinal dimension of the strip. The particular angle of the strand array can be predetermined in the winding process and can be adjusted to provide the desired friction characteristics, whereby the forces to be applied to or resisted by the friction facing will be in a direction that more or less crosses the longitudinal dimensions of the strands.

A backing for the friction facing is formed of millboard stock which consists of asbestos fibers pressed into the board form. Blanks, generally designated 15 (Fig.

5), are cut from said asbestos fiber mill-board in the shape of the desired clutch facing and the blanks are then impregnated in the binder material consisting of dilute synthetic resin or oils or rubber until the blanks are well saturated. It is important that at least one of the materials with which the mill-board blanks are impregnated is the same material that is used to impregnate the strands that are wound into the helical coils.

The size of the asbestos mill-board blanks in the case of clutch facings is arranged to have an outside diameter of approximately $\frac{1}{16}$ of an inch smaller and the inside diameter $\frac{1}{16}$ of an inch larger than the corresponding dimensions of the finished clutch facing. This is done so that the strand portion of the finished clutch facing will flow over the edges of the friction element. When brake linings are to be formed, the straight edges of the mill-board backing are also arranged to be narrower by $\frac{1}{16}$ of an inch than the edges of the strand windings so that brake linings would also have strands at their edges.

The impregnated fiber blank 15 is then placed in the channel of a forming die which is $\frac{1}{16}$ of an inch smaller than the finished outside diameter of the finished friction element and $\frac{1}{16}$ of an inch larger than the finished inside diameter of said element. A biscuit 14 of the helically wound yarns is then placed on top of the blank and the die is closed so as to preliminarily press the two materials together into a unitary compact.

The pressed compact is then placed in a suitable mold whose dimensions are exactly that of the desired finished friction element and the compact within the mold is pressed in a heated hydraulic press. During this pressing the binder in both the helically wound strand portion and in the asbestos fiber mill-board portion flow together and form a solid laminated friction element, a greatly enlarged cross section of which is shown in Figure 6. An aperture 17 is intended to accommodate a countersunk bolt head.

After pressing, the composite biscuit is subjected to a long saturating baking in controlled heat to insure stability of performance and good wearing qualities and also to render the binders substantially insoluble to water, oils, acids, and other deleterious materials. This curing process is also effective in relieving structural strains in the materials so that a dimensionally stable product is produced.

The thicknesses of the backing material as well as of the helically wound strands are selected so that upon compression and reduction in thickness in the compacting and pressing processes described above, allowances are made to obtain a finished thickness which renders the friction element suitable for use as a clutch facing or a brake lining. The thickness of the backing portion 15 is determined by the height of the heads of the bolts which are used to secure the friction elements to the clutch head or the brake shoe. It is apparent that the superior friction material comprising the helical wound strands should extend to or just slightly below the countersunk bolt heads. In some cases it may be desired to cut, mill or grind the friction elements to size after they are pressed and cured.

Sometimes it is found that the asbestos fiber mill-board stock has a certain "grain." This is often caused by the orientation of the asbestos fibers in the mill-board which is produced by various manufacturing processes which prevent the asbestos fibers from having a truly random array. In other cases the asbestos fiber mill-board may have structural strains which differ in intensity and direction throughout the stock. I have found that when the friction element is made with a backing of such inferior mill-board stock, the resultant clutch facings sometimes become warped or manifest a "dishing" effect which is induced by the uneven strains and stresses inherent in such stock.

To obviate these difficulties, I utilize an alternative method of making up a composite friction element having a helically wound impregnated strand facing with a backing made up of impregnated asbestos fibers. In this case, however, instead of using a pre-formed asbestos fiber mill-board blank, I take loose asbestos fibers which have been macerated, mix them with a binder having one or more substances which are similar to those used in the impregnating material for the asbestos strands. The impregnated macerated fibers are then treated by heat or otherwise to drive off any volatile matter present in the binder.

A partly pressed coil 18 of helically wound impregnated asbestos strands is placed into the female member 19 of a die (see Fig. 7). Then a mass 21 of loose impregnated macerated fibers in random array in all directions is placed over the coil after which male member 22 of the die is brought down to press the two materials into a preliminary biscuit. The biscuit is then placed in a final mold and subjected to heat and pressure treatment to cure the friction element and to determine its final size in accordance with the methods described hereinabove. A greatly enlarged cross section of such a friction facing is shown in Figure 8.

It is apparent that this process can be reversed by placing the mass of loose impregnated fibers first in the die and then placing the helically wound coil over the fibers, after which two materials may be compacted. The resulting compact will be substantially the same as produced by the reverse method.

By this method a unitary friction element is made which manifests no "dishing" or warping effects. This absence of warping or dishing appears to result from the fact that the macerated asbestos fibers of the friction disk have been placed in the die with random distribution or orientation, so that when even pressure is applied on the whole mass of said fibers, no strain areas were set up in the final compact.

It is observed in friction elements actually produced by this second method that a portion of the macerated fibers infiltrate into some of the interstices between various strands in the helically wound coil section, particularly in the region of the juncture between the two layers. Thus there is produced an element having two different component layers which when bonded together do not display a sharp line of demarcation between them but which rather flow one into the other to form a unitary integral compact. Although Figure 8 is intended to suggest such a structure, it is quite apparent that no line illustration can truly represent the fused bonding area between the two layers as described herein.

Friction elements produced by this macerated fiber method show a bonding area which is composed partly of impregnated strands with impregnated fibers interspersed therewith. The resultant structure exhibits very high strength and very long life characteristics.

The method of the present invention can also be applied to friction elements having facings composed of impregnated strands disposed in other than helically wound coils. The application and compression of a mass of loose impregnated fibers upon such other strand facings so that the compressed fibers serve as an inexpensive expendable backing is contemplated by the present invention.

It will be understood that modifications may be made in the methods described herein and in the arrangement of component parts without departing from the spirit of the invention.

I claim:

1. A method of making a friction element which comprises placing a helically wound coil of impregnated strands in a die, placing over said strands a mass of loose impregnated fibers, and then compacting said strands and fibers into a solid unitary structure.

2. The method according to claim 1 and further including the step of curing said unitary structure.

3. A method of making a friction element which comprises compacting a mass of impregnated fibers upon and into a helically wound coil of impregnated strands.

4. A method of making a friction element which comprises placing adjacent a helically wound coil of impregnated strands a mass of loose impregnated fibers and compacting said strands and fibers into a unitary structure.

5. A method of making a friction element which comprises placing adjacent a helically wound coil of impregnated strands a mass of loose impregnated fibers disposed in a random array in all directions and compacting said strands and fibers into a unitary structure.

6. A friction element comprising a facing composed of helically wound impregnated strands, said strands being arrayed generally at an angle to the longitudinal direction of said element, and a backing composed of impregnated asbestos fiber mill-board stock, at least one element of the materials with which said strands and said stock are impregnated being common to both, said facing and backing being bonded directly to each other.

7. A friction element comprising a facing composed of helically wound impregnated strands, said strands being arrayed generally at an angle to the longitudinal direction of said element, and a backing composed of impregnated and compacted fibers, at least one element of the materials with which said strands and said fibers are impregnated being common to both, said facing and said backing being bonded directly together.

8. A friction element according to claim 7 in which some of said fibers are infiltrated into at least some of the interstices between said strands.

9. The method of making a friction element which comprises arranging a plurality of impregnated strands in a manner whereby interstices are formed between said strands, disposing a mass of loose impregnated fibers in random array adjacent said strands and compacting said strands and fibers into a unitary structure, the face of said element being composed pricipally by said strands and the backing being composed principally by said fibers.

10. The method of making a friction element which comprises arranging a plurality of impregnated strands in a manner whereby interstices are formed between said strands, disposing a mass of loose impregnated fibers in random array adjacent said strands whereby at least some of said fibers infiltrate some of said interstices in the area of the juncture between the strands and the mass of fibers, and compacting said strands and fibers into a unitary structure, the face of said element being composed principally by said strands and the backing being composed principally by said fibers.

11. The method of making a friction element according to claim 10, and including the further step of curing said unitary structure.

12. A friction element comprising a plurality of impregnated strands arranged in a manner to form interstices between said strands, a mass of loose impregnated fibers in random array adjacent said strands, a portion of said fibers extending into at least some of said interstices, said strands and said fibers being compacted into a unitary structure, the face of said element being composed principally of said strands and the backing being composed principally of said fibers.

13. A friction element according to claim 12 in which at least one element of the materials with which the strands and fibers are impregnated is common to both.

14. The method of making a friction element which comprises placing adjacent a plurality of impregnated strands a mass of loose impregnated fibers and compacting said strands and fibers into a unitary structure.

References Cited in the file of this patent

UNITED STATES PATENTS

| | | |
|---|---|---|
| 1,429,266 | Achtmeyer | Sept. 19, 1922 |
| 1,941,872 | Abert | Jan. 2, 1934 |
| 1,994,979 | Collier | Mar. 19, 1935 |
| 2,009,207 | Rosner | July 23, 1935 |
| 2,258,237 | Bockius et al. | Oct. 7, 1941 |
| 2,264,901 | Gosling | Dec. 2, 1941 |
| 2,546,056 | Batchelor | Mar. 20, 1951 |
| 2,553,698 | Brahs | May 22, 1951 |
| 2,555,261 | Walters | May 29, 1951 |